United States Patent
Kosaka

[11] 3,777,244
[45] Dec. 4, 1973

[54] SPEED CONTROL DEVICE FOR A D.C. MOTOR

[75] Inventor: Shinya Kosaka, Tokyo, Japan

[73] Assignee: Olympus Optical Co., Ltd., Tokyo, Japan

[22] Filed: July 12, 1972

[21] Appl. No.: 271,196

[30] Foreign Application Priority Data

| July 12, 1971 | Japan | 46/51578 |
| July 16, 1971 | Japan | 46/53385 |
| July 20, 1971 | Japan | 46/54010 |
| July 23, 1971 | Japan | 46/55011 |
| July 26, 1971 | Japan | 46/55773 |
| July 29, 1971 | Japan | 46/56989 |
| Aug. 6, 1971 | Japan | 46/59372 |
| Aug. 6, 1971 | Japan | 46/59373 |

[52] U.S. Cl. .............................. 318/331
[51] Int. Cl. ............................... H02p 5/16
[58] Field of Search .............. 318/331, 332, 345

[56] References Cited
UNITED STATES PATENTS

| 3,447,056 | 5/1969 | Kosaka | 318/332 |
| 3,475,672 | 10/1969 | Oltendorf | 318/331 |
| 3,521,140 | 7/1970 | Kobayashi | 318/331 |
| 3,536,972 | 10/1970 | Lutz | 318/331 |
| 3,560,828 | 2/1971 | Kobayashi | 318/332 |

*Primary Examiner*—Bernard A. Gilheany
*Assistant Examiner*—Thomas Langer
*Attorney*—Solon B. Kemon et al.

[57] ABSTRACT

A speed control device of a D.C. motor including a comparator for detecting voltage corresponding to the rotation speed of the D.C. motor from the detection terminal of a bridge circuit having one of its arms connected to the D.C. motor and comparing the voltage thus detected with the reference voltage so as to control the amount of current running through a power supply control transistor disposed between the power supply terminal of the bridge circuit and the D.C. power source and maintain the rotation speed of the D.C. motor, characterized in that said speed control device comprises a reference voltage generating circuit consisting of a field effect transistor and a reference voltage across the reference resistor.

63 Claims, 39 Drawing Figures

SPEED CONTROL DEVICE FOR A D.C. MOTOR

BACKGROUND OF THE INVENTION

This invention relates to the speed control device of a D.C. motor and more particularly a type capable of maintaining the rotation speed of the D.C. motor using a bridge circuit.

The known speed control device of a D.C. motor comprises a bridge circuit having one of its arms connected to a D.C. motor whose speed should be controlled; detects changes in the terminal voltage corresponding to variations in the rotation speed of the D.C. motor at the detection terminal of the bridge circuit; and controls the amount of current supplied to the D.C. motor by output derived from comparison of the detected voltage with the reference voltage. In this case, known reference voltage source consists of a D.C. power source or a Zener diode. Since, however, these elements do not have constant properties, the resistors constituting the remaining three arms of the bridge circuit must have their capacities adjusted in order to fix the rotation speed of the D.C. motor, presenting the drawbacks that exceedingly time-consuming work is required and accurate speed control is impossible. Therefore, it is very difficult for any of the conventional speed control devices to effect the accurate speed control of particularly such type of D.C. motor as is subject to sharp variations in the load torque.

It is accordingly the object of this invention to provide a D.C. motor speed control device of simple construction capable of always attaining the accurate speed control of said motor without being affected by variations in the properties of elements constituting the associated circuit and changing amounts of load.

SUMMARY OF THE INVENTION

According to an aspect of this invention, there is provided a D.C. motor speed control device which comprises a bridge circuit having one of its arms connected to a D.C. motor and including a first detection terminal to which there are connected a power supply terminal associated with the D.C. power source and the power supply terminal of the D.C. motor for detecting the equilibrium condition of the bridge circuit and a second detection terminal; a power supply control transistor connected between the D.C. power source and the power supply terminal of the bridge circuit; a comparator connected between the aforesaid two detection terminals to detect voltage corresponding to the rotation speed of the D.C. motor and compare the detected voltage with the reference voltage, thereby controlling the amount of current running through the power supply control transistor; and a reference voltage generating circuit associated with the comparator and including a field effect transistor and a reference resistor connected in series thereto, thereby generating the reference voltage across the reference resistor.

DESCRIPTION OF THE PREFERRED EMBODIMENTS

Figure 1:
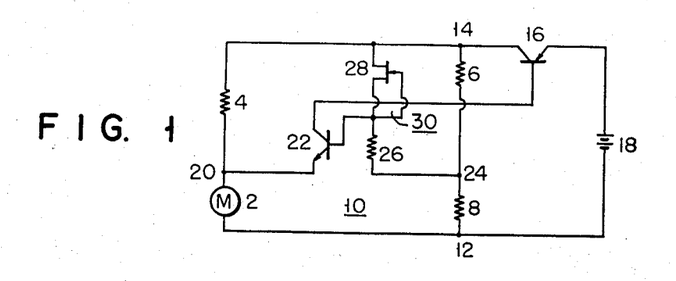
FIG. 1 is a circuit diagram of a D.C. motor speed control device according to an embodiment of this invention.

Referring to FIG. 1, there is connected a D.C. power source 18 through a power supply control transistor 16 connected in series between the power supply terminal of a bridge circuit 10 having one of its arms connected to a D.C. motor 2 and the remaining three arms connected to resistors 4, 6 and 8 respectively, that is, the junction 12 of the D.C. motor 2 with the resistor 8 and the junction 14 of the resistors 4 and 6. To the first detection terminal 20 of the bridge circuit 10, that is, the junction of one power supply terminal of the D.C. motor 2 with the resistor 4 is connected the emitter of a comparison transistor 22 constituting a comparator. To the second detection terminal 24 of the bridge circuit 10, that is, the junction of the resistors 6 and 8 is connected the base of the comparison transistor 22 through a reference resistor 26. Said base is further connected to the source of a field effect transistor 28 (hereinafter abbreviated as "FET") having its drain connected to the power supply terminal. The source and gate of FET 28 are short-circuited, so that said FET 28 is so connected as to have its drain supplied with saturated current. The saturated drain current passing through FET 28 is always rendered substantially constant, causing constant voltage to be generated across the reference resistor 26 connected in series to FET 28. Accordingly, a circuit consisting of FET 28 and the reference resistor 26 connected in series acts as a reference voltage generating circuit 30 for impressing reference voltage on the base of the comparison transistor 22. The collector of the comparison transistor 22 is connected to the base of the power supply control transistor 16.

Now let the voltage across the source and drain of FET 28 be designated as $Vds$, the drain current as $Id$, the voltage across the gate and source of FET 28 as $Vgs$, the pinch off voltage as $Vp$, the saturated drain current as $Idss$ and the terminal voltage of the reference resistor 26 as $Vf$. Then if $Vds > Vp$, there obviously results $Id = Idss$, provided $Vgs = 0$ as in FIG. 1. The saturated drain current takes a value specific of the FET used, which is subject to little change even when Vds varies within the range of $Vds > Vp$. Thus results $Vf = Idss \cdot R$ (where $R$ denotes the capacity of the resistor 26) and in consequence Vf represents constant voltage determined by the value of $R$.

There will now be described the operation of the embodiment of FIG. 1. Where the increased load of the D.C. motor 2 leads to a decline in its rotation speed, there results a decrease in the terminal voltage of said motor 2 and in consequence the potential of the first detection terminal 20. Since the comparison transistor 22 is impressed with output reference voltage from the reference voltage generating circuit 30, the base current and collector current of said transistor 22 increase, and the increased collector current elevates the base current and in consequence the collector current of the power supply control transistor 16. This causes a larger amount of current to be supplied to the D.C. motor 2 connected to the bridge circuit 10 with the resultant acceleration of its rotation speed. Where the reduced load quickens the rotation speed of the D.C. motor 2, the potential of the first detection terminal 20 rises and conversely the base current and in consequence the collector current of the power supply control transistor 16 decrease to slow down the rotation speed of the motor 2. Thus the motor 2 is automatically controlled to rotate always at a preset speed, regardless of the magnitude of load supplied.

Figure 2:
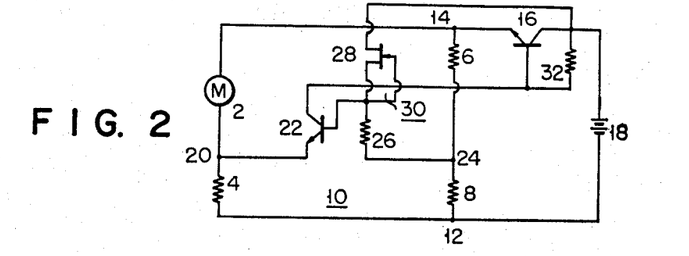
FIGS. 2 to 17 are the circuit diagrams of other embodiments where the base of a comparison transistor is impressed, as in FIG. 1, with a reference voltage.

Throughout the undermentioned embodiments, the parts the same as those of FIG. 1 are denoted by the same numbers and description thereof is omitted. There will be given description only of different parts from those of FIG. 1 as well as of their operation. FIG. 2 presents a D.C. motor speed control device wherein the D.C. motor 2 is connected between the power supply terminal 14 and the first detection terminal 20, the resistor 4 between the power supply terminal 12 and said first detection terminal 20, a bias resistor 32 between the base and collector of the power supply transistor 16 and further the drain of the comparison transistor 28 is directly connected to one end of the power supply source 18.

The embodiment of FIG. 1 fails to produce a stable preset voltage Vf, unless the voltage (designated as $V_6$) across the terminals 14 and 24 of the bridge circuit 10 is sufficiently large to satisfy $V_6 > Vp + Vf$. If, however, the drain of the comparison transistor is directly connected, as in the embodiment of FIG. 2, to one end of the power supply source 18, then there will be obtained a fully large voltage $Vf$ and in consequence a stable preset voltage.

Referring to FIG. 2, the increased load of the D.C. motor 2 and the resultant decreased rotation speed thereof elevate the potential of the first detection terminal 20 and in consequence reduces the collector current of the comparison transistor 22. This causes a smaller amount of current to pass through the bias resistor 32, with the result that voltage drop in the resistor 32 is minimized and the base potential of the power supply control transistor 16 rises. Therefore, in the embodiment of FIG. 2 wherein power supply control transistor 16 has an emitter follower connection, the voltage of the power supply terminal 14 sufficiently rises to accelerate the rotation speed of the D.C. motor 2 to a preset level.

Figure 3:
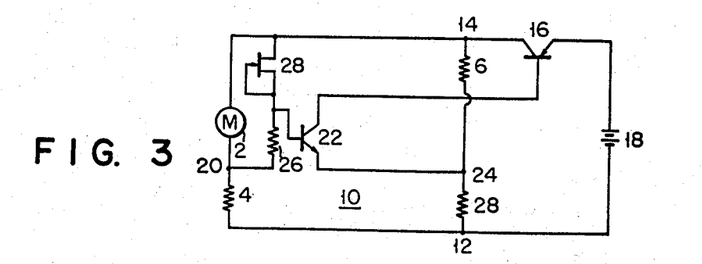

FIGS. 1 and 2 refer to the case where the emitter of the comparison transistor 22 was connected to the first detection terminal 20. However, the same effect will be obtained, if said emitter is connected to the second detection terminal with the base of said transistor 22 connected to the first detection terminal through the reference resistor 26. The arrangement is presented in FIG. 3. In the embodiment of FIG. 3, the increased load of the D.C. motor 2 elevates, as in FIG. 2, the base potential of the transistor 22 and in consequence the collector current of the power supply control transistor 16. In the embodiment of FIG. 3, the drain of FET 28 is connected, as in FIG. 1, to the power supply terminal 14.

Figure 4:
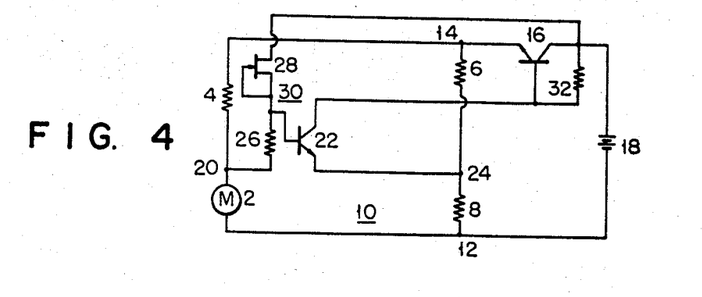
Figure 5:
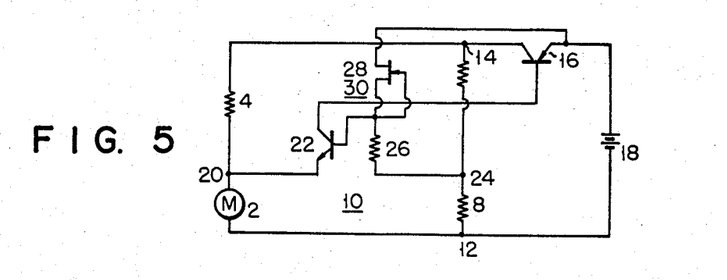

Referring to the embodiment of FIG. 4, the D.C. motor 2 is connected between the first detection terminal 20 and the power supply terminal 12. As in FIG. 1, therefore, the increased load of the D.C. motor 2 decreases the base potential and in consequence the collector current of the comparison transistor 22. As the result, voltage drop in the resistor 32 is minimized to increase the base potential and in consequence the collector current of the power supply control transistor 16. For the same reason described in connection with FIG. 2, the embodiment of FIG. 3 sometimes fails to produce a stable preset voltage, unless the voltage (designated as $V_2$) across the power supply terminal 14 and the first detection terminal 20 is sufficiently large to satisfy $V_2 > Vp + Vf$. If, in such case, the drain of FET 28 is directly connected, as in FIG. 5, to the power supply source 18, then there will be obtained fully large voltage $V_2$ and in consequence a stable preset voltage.

Figure 6:
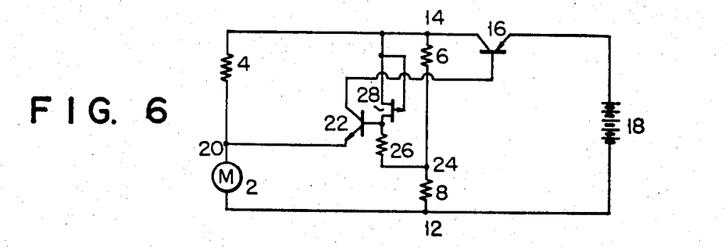

The embodiment of FIG. 1 has the source of FET 28 included in the reference voltage generating circuit 30 connected to the reference resistor 26. If, however, the drain D of the FET 28 is connected, as shown in FIG. 6, to the reference resistor 26, there will be obtained the same effect. The other parts of FIG. 6 are constructed and operated in the same manner as those of FIG. 1. Also in the embodiments of FIGS. 2 to 5, the drain D of the FET 28 may obviously be connected to the reference resistor 26.

The embodiments of FIGS. 1 to 6 all refer to the case where the source S of the FET 28 was directly connected to the gate thereof. If, however, the source of the FET 28 is connected to the power supply terminal 14 through a source resistor 34 and also the gate G thereof, then there will be effected a more stable speed control.

Figure 8:
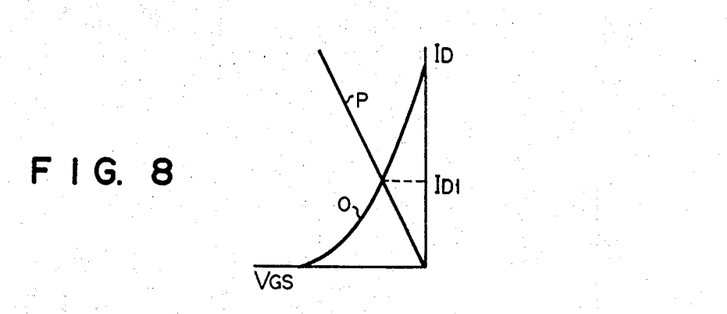

To the FET 28 is connected in series a source resistor 34 acting as a load. Obviously, therefore, the FET 28 has its drain supplied, as shown in FIG. 8, with current $Id_1$ corresponding to the intersection of the $Id - Vgs$ curve 0 of said FET 28 and the load variation curve P of the resistor 34. This current $Id_1$ is not saturated drain current, but little changes even if $Vds$ varies within the range of $Vds > Vp$, provided the resistor 34 has a constant capacity. The other parts of FIG. 8 are operated in the same manner as those of FIG. 6.

Figure 7:
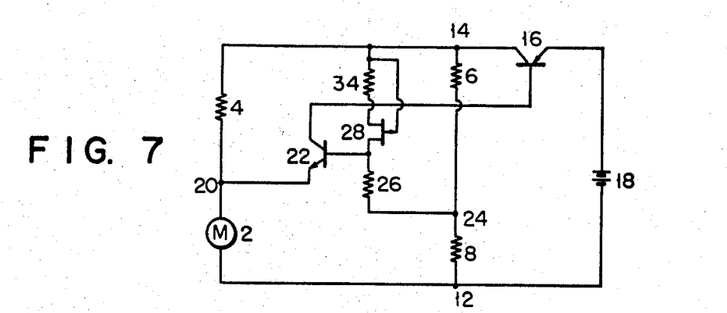
Figure 9:
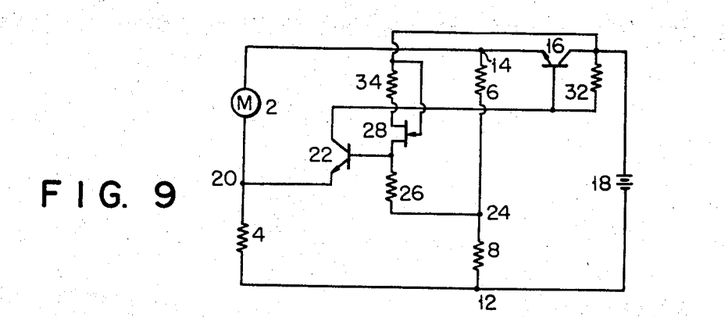

FIG. 9 represents the embodiment wherein the circuit of FIG. 7 is additionally provided with a bias resistor 32 as described in connection with FIG. 2 and the source of the FET 28 is connected to one end of the power supply source 18. The embodiment of FIG. 9 is operated in the same manner as those of FIGS. 2 and 7.

Figure 10:
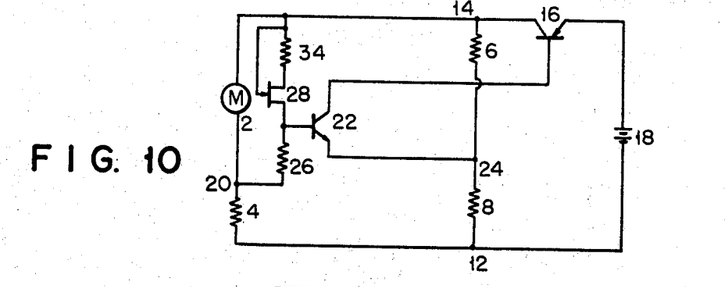
Figure 11:
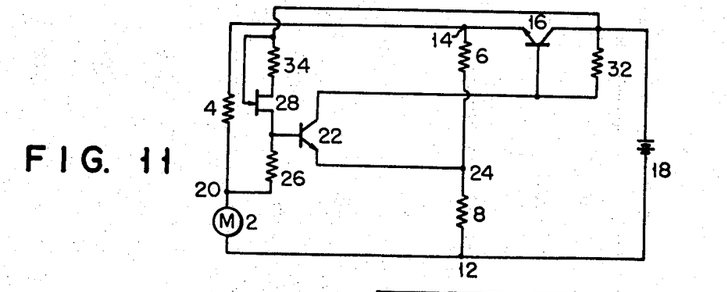
Figure 12:
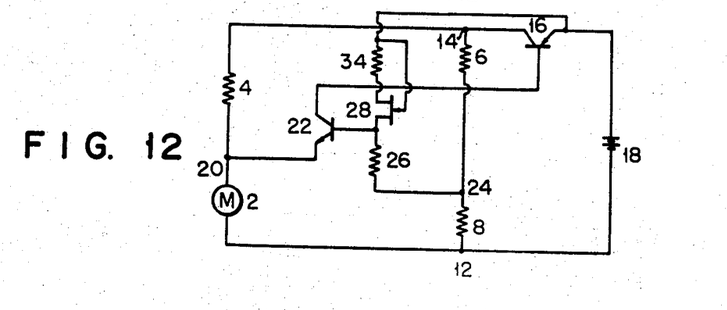

The embodiments of FIGS. 10 and 11 are modifications of those of FIGS. 7 and 9 respectively, wherein the emitter of the comparison transistor 22 is connected to the second detection terminal 24 and the base thereof to the first detection terminal 20 through the reference resistor 26. FIG. 10 represents the case where the collector of the comparison transistor 22 is directly connected to the base of the power supply control transistor 16, and FIG. 11 refers to the case where the bias resistor 32 is connected between the base and collector of said transistor 16. The circuits of FIGS. 10 and 11 are operated in the same manner as previously described. FIG. 12 shows the embodiment wherein the FET 28 of FIG. 7 has its source connected to the positive terminal of the power supply source 18 through the source resistor 34. The embodiment of FIG. 12 is operated in the same manner as that of FIG. 7.

Figure 13:
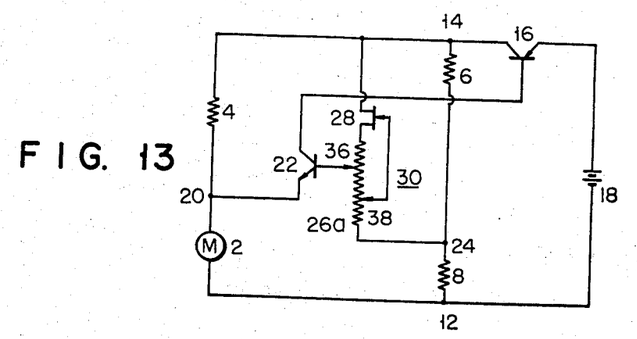

In the embodiment of FIG. 13, the reference resistor 26 of the reference voltage generating circuit 30 consists of a variable resistor 26a including a first resistance varying terminal 36 connected to the base of the comparison transistor 22 and a second resistance varying terminal 38 connected to the gate of the FET 28. It will be understood that the circuit of FIG. 3 can be operated by the same principle as that of FIG. 7, if resistance from the first resistance varying terminal 36 to the second detection terminal 24 is considered as equal to that of the reference resistor 26 of FIG. 7 and the resistance across the second resistance varying terminal 38 and the gate of the FET 28 is taken as an equivalent to that of the source resistor 34 of FIG. 7. According to the embodiment of FIG. 13, the drain current $Id_1$ of the FET 28 is chosen by defining the position of the second resistance varying terminal 38 and thereafter the first resistance varying terminal 36 is shifted to change the capacity of the reference resistor 26, thereby supplying the base of the comparison transistor 22 with optional reference voltage $Vf$. Thus said reference voltage $Vf$ can be freely set only by such simple adjustment.

Figure 14:
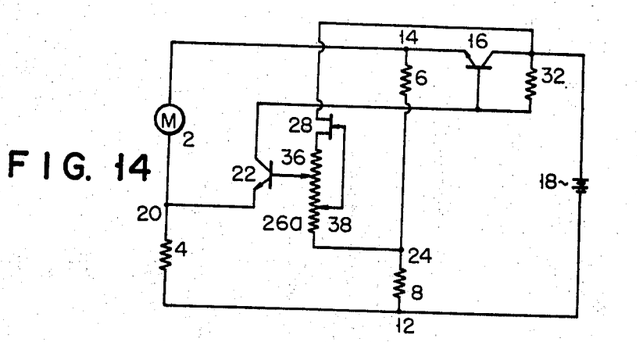

FIG. 14 shows the embodiment wherein the D.C. motor 2 is connected between the first detection terminal 20 and the power supply terminal, the resistor 32 is connected between the base and collector of the power supply control transistor 16 and the drain of the FET 28 is directly connected to one end of the power supply source 18. This means the advantage of FIG. 13 added to the embodiment of FIG. 9.

Figure 15:
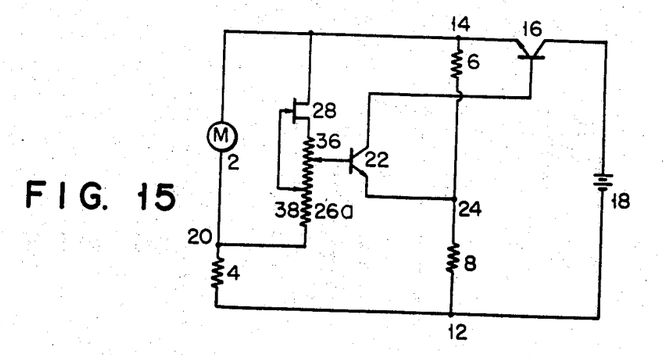
Figures 16, 17:
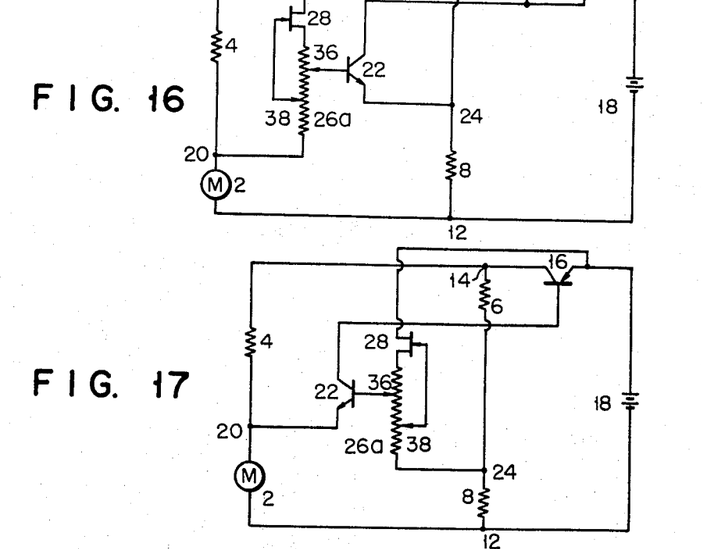

FIGS. 15 and 16 indicate the modifications of FIGS. 13 and 14 respectively where the emitter of the comparison transistor 22 is connected to the second detection terminal 24 and the base thereof is connected to the first detection terminal 20 through the first resistance varying terminal 36 and variable resistor 26a. The operation of FIGS. 15 and 16 is the same as previously described. FIG. 17 is a further modification of FIG. 13 wherein the drain of the FET 28 is directly connected to the positive terminal of the power supply source 18.

The foregoing embodiments of FIGS. 1 to 17 refer to the case where the base of comparison transistor 22 is supplied with output from the reference voltage generating circuit 30 to compare said output with output from the first detection terminal 20 of the bridge circuit. As shown in FIGS. 18 to 33, however, the reference voltage may be supplied to the emitter of the comparison transistor 22.

Figure 18:
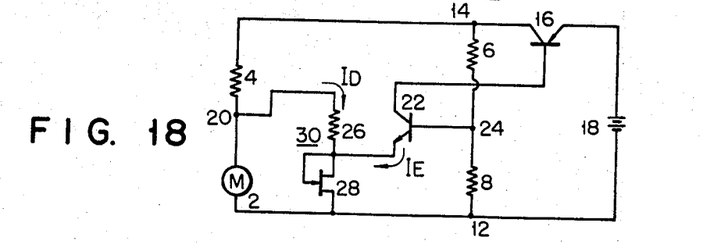
FIGS. 18 to 33 are the circuit diagrams of still other embodiments where the emitter of the comparison transistor is impressed with the reference voltage.

FIG. 18 represents the most fundament of the embodiments of FIGS. 18 to 33. In FIG. 18, the emitter of the comparison transistor 22 is connected to the power supply terminal 12 through the first detection terminal 20 through the reference resistor 26 of the reference voltage generating circuit 30 and the FET 28, and the source and gate of the FET 28 are short circuited so as to have its drain supplied with saturated current. The comparison transistor 22 has its base connected to the second detection terminal 24 and its collector connected, as in FIG. 1, to the base of the power supply control transistor 16.

According to the circuit of FIG. 18, the increased load of the D.C. motor 2 reduces its rotation speed and in consequence the potential of the first detection terminal 20. Said potential drop is transmitted to the emitter of the comparison transistor 22 through the reference resistor 26 to increase the base current and in consequence the collector current of said comparison transistor 22. Said increased collector current elevates the collector current of the power supply control transistor 16, thereby raising the rotation of the D.C. motor to an equilibrium level. In the embodiment of FIG. 18, it will sometimes be impossible to attain the accurate control of the motor rotation speed, unless the circuit is so arranged as to cause the current passing through the resistor 26 to bear a ratio larger than at least 10 : 1 to the current introduced into the FET 28 from the emitter of the comparison transistor 22. Following is the reason. Since the amount of current flowing through the FET 28 is fixed, variations in the current influx from the emitter of the comparison transistor 22 lead to corresponding changes in the amount of current running through the reference resistor 26. If said changes become too prominent, the terminal voltage of said resistor 26 will fail to be used as a prescribed voltage.

Figure 19:
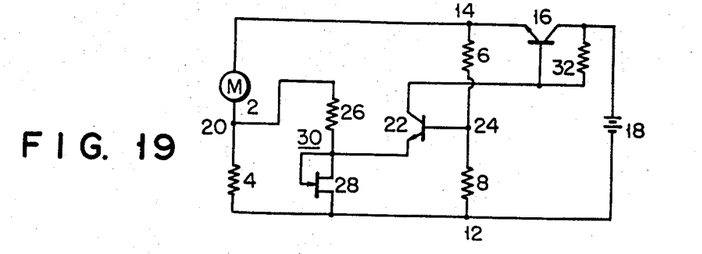

FIG. 19 represents the embodiment wherein the D.C motor 2 is connected between the power supply terminal 14 and the first detection terminal 20; the resistor 4 is connected between the power supply terminal 12 and the first detection terminal 20; and the bias resistor 32 is connected between the base and collector of the power supply control transistor 16. In the embodiment of FIG. 19, the reduced rotation speed of the D.C. motor 2 increases the potential of the first detection terminal 20 and the emitter potential of the comparison transistor 22 with the resultant decrease in the collector current of said transistor 22. Accordingly, voltage drop in the resistor 32 is minimized by a decline in the amount of current conducted through the bias resistor 32, thus increasing the base potential of the power supply control transistor 16 and the amount of current being supplied to the D.C. motor 2.

Figure 20:
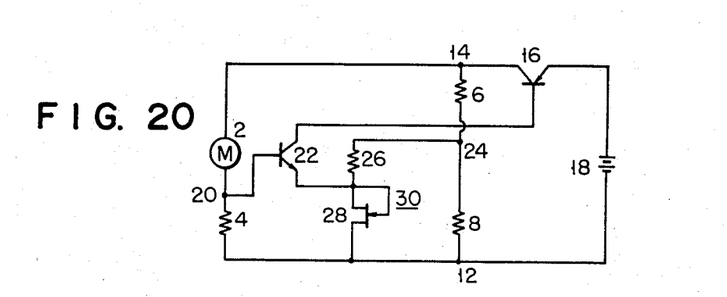

FIG. 20 illustrates the embodiment wherein the base of the comparison transistor 22 is connected to the first detection terminal 20, and the emitter thereof is connected to the output terminal of the reference voltage generating circuit 30 connected between the power supply terminal 12 and the second detection terminal 24. According to the embodiment of FIG. 20, the decreased rotation speed of the D.C. motor elevates the potential of the first detection terminal 20 and the collector current of the comparison transistor 22. As the result, the collector current of the power supply control transistor 16 increases to effect the automatic control of the D.C. motor 2 for its return to an equilibrium speed.

Figure 21:
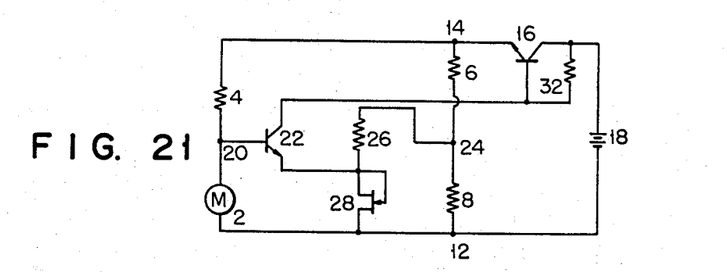

In the embodiment of FIG. 21, the base of the comparison transistor 22 is connected to the first detection terminal 20; the emitter thereof is connected to the second detection terminal 24 through the reference resistor 26; and the bias resistor 32 is connected between the base and collector of the power supply control transistor 16. According to the embodiment of FIG. 21, the decreased rotation speed of the D.C. motor 2 reduces the potential of the first detection terminal 20 and the collector current of the comparison transistor 22, and conversely increases the base potential of the power supply control transistor 16 and the amount of current being conducted from said transistor 16 to the D.C. motor 2, thereby bringing its rotation speed to an equilibrium condition.

Figure 22:
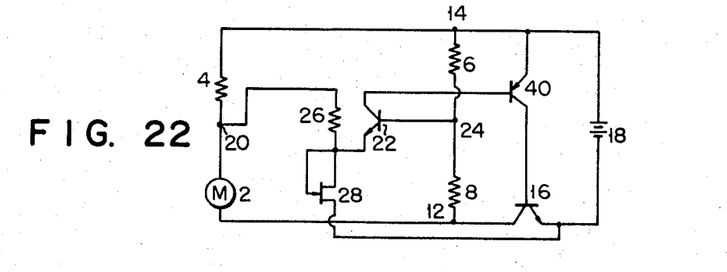

In the embodiment of FIG. 22, the drain of the FET 28 is directly connected to the negative terminal of the power supply source 18; and the collector of the comparison transistor 22 is connected to the base of a transistor 40 connected between the positive terminal of the power supply source 18 and the base of the power supply control transistor 16. According to the embodiment of FIG. 22, the decreased rotation speed of the D.C. motor 2 reduces the potential of the first detection terminal 20 and conversely increases the collector current of the comparison transistor 22, and the base current and in consequence the collector current of the transistor 40. As the result, the amount of current being supplied to the power supply control transistor 16 is increased to raise the rotation speed of the D.C. motor 2 to a prescribed equilibrium condition.

Figure 23:
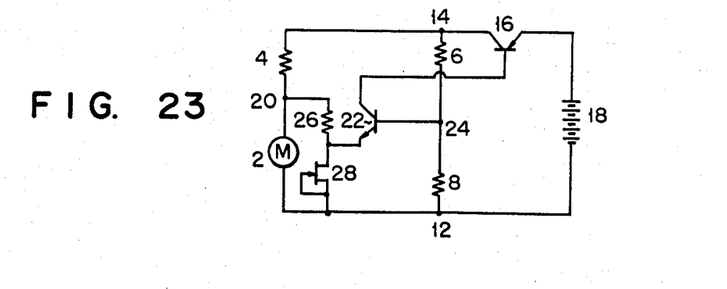

The embodiments of FIGS. 18 to 22 represent the case where the emitter of the comparison transistor 22 was connected to the source of the FET 28. If, however, the emitter of said transistor 22 is connected to the drain of the FET 28 and the source thereof is connected to the power supply terminal 12, there will be obtained the same effect. The embodiment of FIG. 23 is operated in the same manner as that of FIG. 18.

The embodiments of FIGS. 18 to 23 are all so arranged as to short-circuit the gate and source of the FET 28 and have its drain supplied with saturated current. As shown in FIGS. 24 to 28, however, it is possible to connect the source of the FET 28 to the gate thereof through the source resistor 34 acting as a load resistor and also directly to the power supply terminal 12 or one end of the power supply source 18. The reason why connection of said source resistor 34 permits the flow of constant current through the FET 28 is already given by reference to FIG. 8 and further description thereof is omitted.

Figure 24:
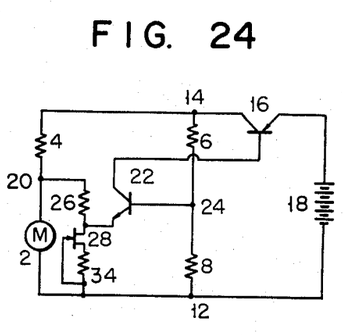

According to the embodiment of FIG. 24, the reduced load of the D.C. motor 2 increases its rotation speed and the potential of the first detection terminal 20 and conversely decreases the collector current of the comparison transistor 22 and in consequence the base current of the power supply control transistor 16. As the result, the amount of current being supplied to said transistor 16 is decreased, thereby bringing down the rotation speed of the D.C. motor 2 to an equilibrium level.

Figure 25:
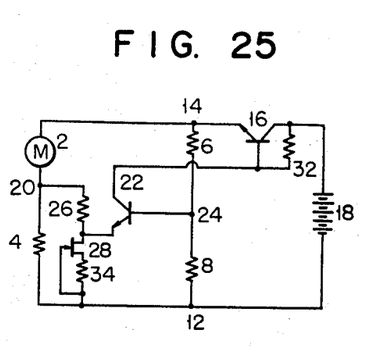

In the embodiment of FIG. 25, the D.C. motor 2 is connected between the power supply terminal 14 and the first detection terminal 20. Therefore, the increased rotation speed of said motor 2 decreases the potential of the first detection terminal 20 and elevates the collector current of the comparison transistor 22, so that a larger amount of current passes through the bias resistor 32, to give rise to a prominent voltage drop therein. As the result, the base potential of the power supply control transistor 16 falls with the resultant decrease in the amount of current being conducted therethrough, thus reducing the rotation speed of the D.C. motor 2 to an equilibrium state.

Figure 26:
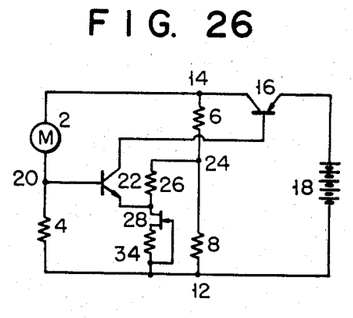
Figure 27:
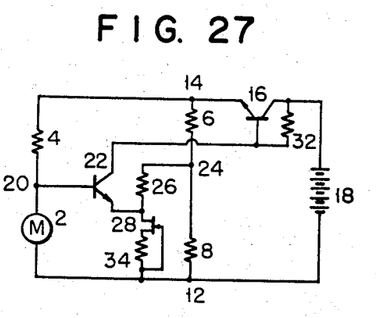

In the embodiments of FIGS. 26 and 27, the base of the comparison transistor 22 is connected to the first detection terminal 20. In FIG. 26, the decreased rotation speed of the D.C. motor 2 increases the potential of the first detection terminal 20 and the collector current of the comparison transistor 22, causing a larger amount of current to be conducted from the power supply control transistor 16 to the D.C. motor 2. In FIG. 27, the slow down of the D.C. motor 2 decreases the potential of the first detection terminal 20 and the collector current of the comparison transistor 22, thus minimizing voltage drop in the bias resistor 32. The resultant elevated base potential of the power supply control transistor 16 permits the supply of a larger amount of current therefrom to the D.C. motor 2.

Figure 28:
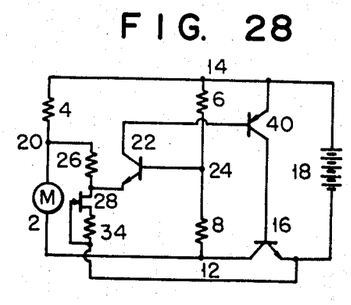

FIG. 28 is a modification of FIG. 22 wherein the FET 28 has its source and drain connected in reverse relationship from FIG. 22 and is substantially supplied with the source resistor 34. While, in FIG. 22, the FET 28 has its drain supplied with saturated current, the embodiment of FIG. 28 causes the FET 28 to be supplied with prescribed current determined by the source of resistor 34. It is only in this respect that the embodiment of FIG. 28 differs from that of FIG. 22. The other parts of FIG. 28 are arranged and operated in the same manner as in FIG. 22.

Figure 29:
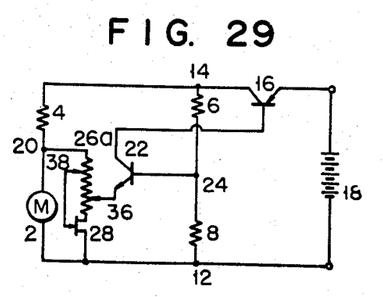
Figure 30:
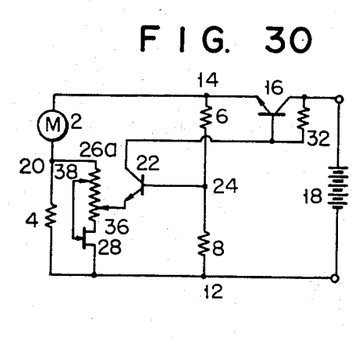

In the embodiments of FIGS. 29 to 33, the reference voltage generating circuit 30 consists of a variable resistor 26a connected in series with the FET 28, as in FIGS. 13 to 17. In FIGS. 29 and 30, the base of the comparison transistor 22 is connected to the second detection terminal 24 and the emitter thereof is connected to the first detection terminal 20 through the first resistance varying terminal 36 and variable resistor 26a. In the embodiment of FIG. 29, the resistance across the first resistance varying terminal 36 and the first detection terminal 20 is made equal to that of the reference resistor 26 and the resistance across the second resistance varying terminal 38 and the source of the FET 28 is made equal to that of the source resistor 34. Accordingly, movement of the first and second resistance varying terminals 36 and 38 can change the capacity of the reference resistor 26 and source resistor 34.

If, in the embodiment of FIG. 29, the D.C. motor 2 happens to slow down in rotation speed while being operated with the resistance varying terminals 36 and 38 kept in the prescribed positions, then the resultant potential drop of the first detection terminal 20 will increase the collection current of the comparison transistor 22 to thereby supplying a larger amount of current from the power supply control transistor 16 to the D.C motor 2.

In the embodiment of FIG. 30, the D.C. motor 2 is connected between the power supply terminal 14 and first detection terminal 20 and the bias resistor 32 is connected between the base and collector of the power supply control transistor 16. According to the embodiment of FIG. 30, the decreased rotation speed of the D.C. motor 2 increases the potential of the first detection terminal 20 and the emitter potential of the comparison transistor 22 and reduces the collector current of said transistor 22, thus minimizing voltage drop in the bias resistor 32. As the result, the power supply control transistor 16 has its base potential increased to supply a larger amount of current to the D.C. motor 2.

Figure 31:
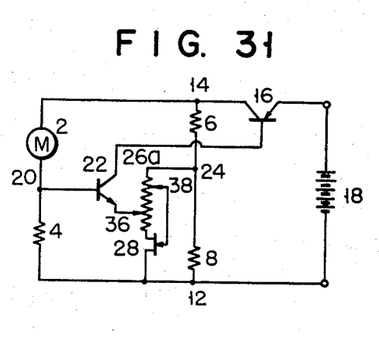
Figure 32:
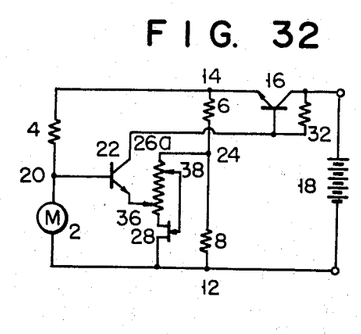

In the embodiments of FIGS. 31 and 32 using the variable resistor 26a, the base of the comparison transistor 22 is connected to the first detection terminal 20 and the emitter thereof is connected to the second detection terminal 24 and power supply terminal 12 through the resistance varying terminal 36 of the variable resistor 26a. In the embodiment of FIG. 31 wherein the D.C. motor 2 is connected between the power supply terminal 14 and the first detection terminal 20, the slowdown of said motor 2 decreases the potential of the first detection terminal 20 and conversely increases the collector current of the comparison transistor 22, thereby supplying a larger amount of current from the power supply control transistor 16 to the D.C. motor 2.

Figure 33:
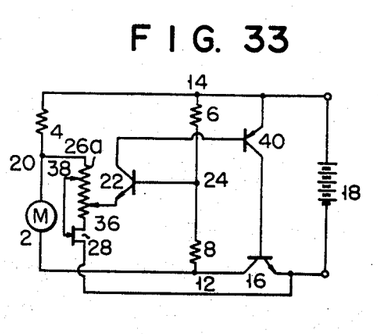

In the embodiment of FIG. 33 using the variable resistor 26a, the base of the comparison transistor 22 is connected to the second detection terminal 24; the drain of the FET 28 is directly connected to the negative terminal of the power supply source 18; and the collector of the comparison transistor 22 is connected to the power supply control transistor 16 through the transistor 40. In the embodiment of FIG. 33, wherein the D.C. motor 2 is connected between the power supply terminal and the first detection terminal 20, the reduced rotation speed of said motor 2 decreases the potential of the first detection terminal 20 and conversely increases the collector current of the comparison transistor 22 and the collector current of the transistor 40. Accordingly, the power supply control transistor 16 supplies a larger amount of current to the D.C. motor 2 to increase its rotation speed up to an equilibrium level.

Figure 34:
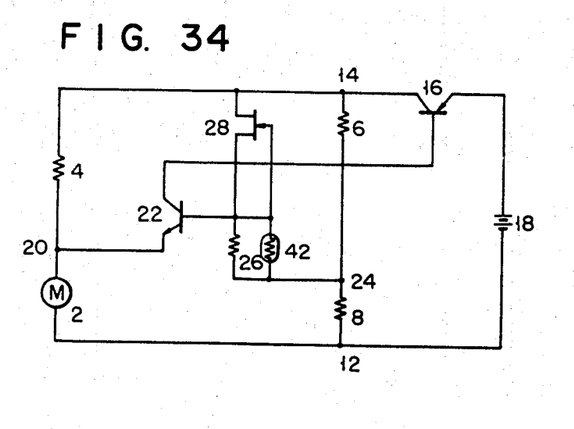
FIGS. 34 to 39 are the circuit diagrams of still other embodiments.

FIG. 34 represents the embodiment wherein there is connected in parallel to the reference resistor 26 a temperature compensation heat-sensitive resistor element 42, for example, a thermistor in order to compensate errors in controlling the motor rotation caused by temperature change. The other parts of FIG. 34 are arranged and operated in the same manner as in FIG. 1. According to the embodiment of FIG. 34, the FET 28 is so designed to have its drain supplied with a preset amount of current and the voltage generated at the terminal of the reference resistor 26 connected in series to said FET 28 is used as reference voltage Therefore, said reference resistor 26 is desired to have a constant capacity. However, said resistor 26 generally tends to present a larger resistance due to temperature rise. If, therefore, there is connected in parallel to said resistor 26 a thermistor whose resistance decreases in inverse proportion to temperature rise, then there will be provided a reference resistor having its capacity kept constant relative to temperature.

Figure 35:
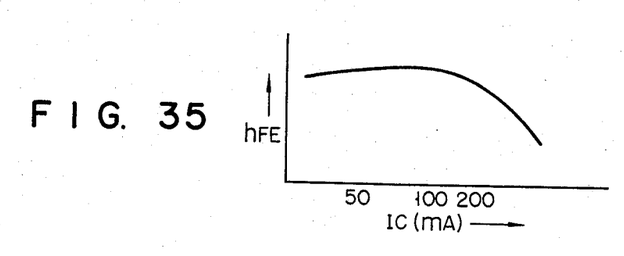
Figure 36:
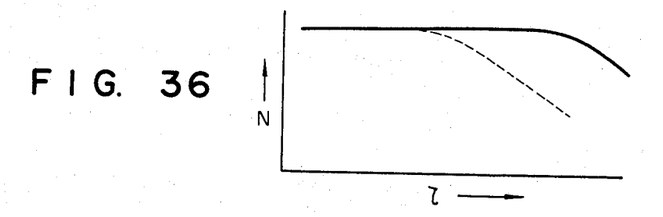

Now let it be assumed that throughout the aforesaid embodiments, the increased torque of the D.C. motor 2 leads to the larger collector current of the power supply control transistor 16. In general, said power supply control transistor 16 consists of a silicon transistor. With said silicon transistor, however, increase in the collector current Ic causes, as shown in FIG. 35, a sharp drop in the parameter $hFE$ indicating the amplifying capacity of said transistor to limit the servo gain of a motor speed control circuit, that is, the range permitting good speed control. A decline in said serve gain prominently decreases, as indicated by the broken line of FIG. 36, the number N of rotations of the D.C. motor 2 as against the increased torque $\tau$, sometimes resulting in a failure to effect accurate speed control.

Figure 37:
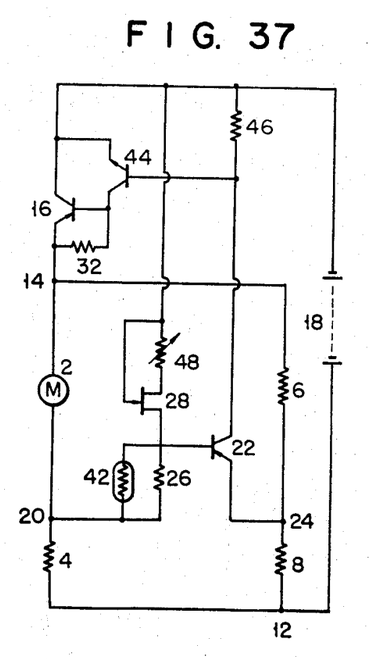

The embodiment of FIG. 37 is intended to eliminate such drawbacks by being so arranged as to carry out accurate speed control over a broad range from the low to the high rotation speed of the D.C. motor 2. According to the embodiment of FIG. 37 there is connected an amplification transistor 44 between the base and collector of the power supply control transistor 16. The base of said amplification transistor 44 is connected through a resistor 46 to the negative terminal of the power supply source 18 and the collector of the comparison transistor 22 and the bias resistor 32 is connected between the base and emitter of the power supply control transistor 16. Further between the source and gate of the FET 28 is connected a variable resistor 48 so as to have its drain supplied with prescribed current. According to the embodiment of FIG. 37, the slowdown of the D.C. motor 2 elevates the potential of the first detection terminal 20 and the base potential of the comparison transistor 22. As the result, said transistor 22 receives a larger collector current and the resistor 46 presents a greater voltage drop so that the transistor 44 has its base potential elevated to be supplied with a larger amount of current. At this time, the power supply control transistor 16 has its base potential reduced by the action of the bias resistor 32 to increase the amount of current being conducted through the power supply control transistor 16. As the result, the current passing through the D.C. motor 2 is shunted to the transistors 16 and 44, so that the collector current of each of said transistors 16 and 44 decreases by that extent. Accordingly, the rotation speed of the D.C. motor 2 can be controlled over a broad range without any decline in the parameter hFE of the power supply control transistor 16. Further, in the embodiment of FIG. 37, the power supply control transistor 16 may consist of a PNP type germanium transistor having better $hFE$ characteristics than the silicon transistor, thus enabling the rotation speed of the D.C. motor 2 to be controlled over a broader range.

Figure 38:
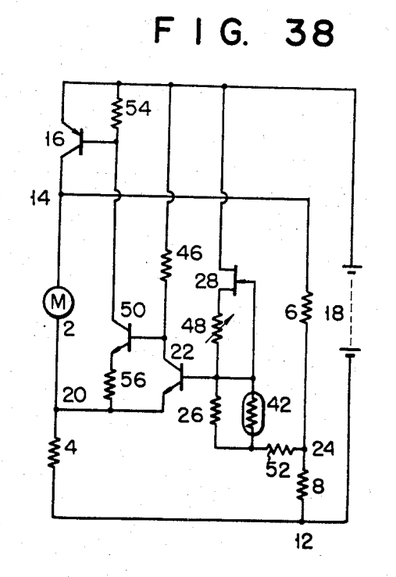

FIG. 38 shows still another embodiment wherein the comparison transistor 22 has its emitter connected to the first detection terminal 20, its collector to one end of the power supply source 18 and the base of an amplification transistor 50 through the resistor 48 and its base to the second detection terminal through a parallel circuit consisting of the reference resistor 26 and thermistor 42 and a level upping resistor 52. Said amplification transistor 50 has its collector connected to one end of the power supply source 18 through the base of the power supply control transistor 16, and its emitter connected to the first detection terminal 20 through a resistor 56.

According to the embodiment of FIG. 38, the reduced rotation speed of the D.C. motor 2 increases the potential of the first detection terminal 20 and decreases the collector current of the comparison transistor 22 so that voltage drop in the resistor 46 is minimized and the base potential and said amplification has its base potential and in consequence its collector current increased. Eventually the power supply control transistor 16 supplies a larger amount of current to the D.C. motor 2 to accelerate its rotation up to an equilibrium level. The resistor 52 used in the embodiment of FIG. 38 is intended to elevate a reference voltage generated across the base of the comparison transistor 22 and the second detection terminal 24 by adding the capacity of said resistor 52 to the reduced composite resistance of a parallel circuit consisting of the reference resistor 26 and thermistor 42.

Figure 39:
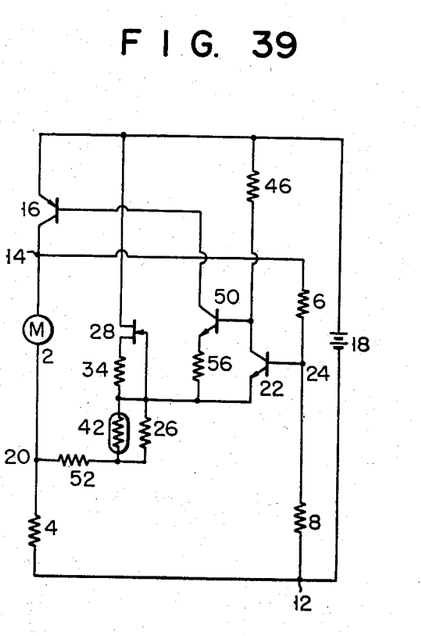

The embodiment of FIG. 38 is so arranged as to cause the base of the comparison transistor 22 to be impressed with a reference voltage. If, as shown in FIG. 39, the base of said transistor 22 is connected to the second detection terminal 24 and its emitter is supplied with output from the reference voltage generating circuit consisting of the reference resistor 26, thermistor 42 and level upping resistor 52, then this modification can be operated in the same manner as in the preceding case. Namely, the slowdown of the D.C. motor 2 increases the potential of the first detection terminal 20 and decreases the collector current of the comparison transistor 22, thus elevating, as in FIG. 38, the base potential and in consequence the collector current of the amplification transistor 50. As the result, the base current of the power supply control transistor 16 and in consequence its collector current being supplied to the D.C. motor 2 are increased to accelerate its rotation speed up to an equilibrium level.

What is claimed is:

1. Apparatus for controlling the rotational speed of a DC motor comprising:
   a bridge circuit having the motor as one arm of the bridge and resistors as the other arms, one opposite pair of bridge terminals being first and second detection terminals and the other pair of opposite terminals being power supply terminals connected to a DC power source;
   a power supply control transistor having its emitter-collector path connected between the DC power source and one of said power supply terminals;
   comparator means connected between said first and second detection terminals to detect voltage corresponding to the rotational speed of the DC motor and to compare the detected voltage with a reference voltage;
   a reference voltage generating circuit connected to between said comparator means and said DC power source and including a field effect transistor having its source and gate interconnected so that said drain is supplied with a substantially constant predetermined current and a reference resistor connected in series with said field effect transistor so that a reference voltage appears across said reference resistor; and
   means connecting said comparator means and the base of said power supply control transistor for controlling the flow of current through said control transistor.

2. The apparatus according to claim 2 wherein said comparator means includes a comparison transistor having base emitter and collector sections, said emitter being connected to one of said first and second detection terminals, said collector being connected to the base of said power supply control transistor and said base being supplied with said reference voltage.

3. The apparatus according to claim 2 wherein said comparison transistor has its emitter connected to said first detection terminal and its base to said second detection terminal through said reference resistor and also on one side of the DC power source through said field effect transistor.

4. The apparatus according to claim 3 wherein said reference resistor is a variable resistor including first and second resistance varying terminals; said comparison transistor has its emitter connected to said first detection terminal and its base to said first resistance varying terminal; and said field effect transistor has its gate connected to said second resistance varying terminal.

5. The apparatus according to claim 3 wherein the said comparison transistor has its collector connected to the base of the said power supply control transistor and also to the collector of said transistor through its bias resistor.

6. The apparatus according to claim 5 wherein the said field effect transistor has its source directly connected to its gate.

7. The apparatus according to claim 5 wherein the said field effect transistor has its source connected to its gate through a source resistor.

8. The apparatus according to claim 3 wherein the said field effect transistor has its source directly connected to its gate.

9. The apparatus according to claim 3 wherein the said field effect transistor has its source connected to its gate through a source resistor.

10. The apparatus according to claim 3 wherein the said comparison transistor has its base connected to the source of the said field effect transistor.

11. The apparatus according to claim 3 wherein the said comparison transistor has its base connected to the drain of the said field effect transistor.

12. The apparatus according to claim 2 wherein said comparison transistor has its emitter connected to said first detection terminal and its base to said second detection terminal through said reference resistor and also to one of said power supply terminals through said field effect transistor.

13. The apparatus according to claim 12 wherein the said field effect transistor has its source directly connected to its gate.

14. The apparatus according to claim 12 wherein the said field effect transistor has its source connected to its gate through a source resistor.

15. The apparatus according to claim 12 wherein the said comparison transistor has its base connected to the source of the said field effect transistor.

16. The apparatus according to claim 12 wherein the said comparison transistor has its base connected to the drain of the said field effect transistor.

17. The apparatus according to claim 12 wherein said reference resistor is a variable resistor including first and second resistance varying terminals; said comparison trnsistor has its emitter connected to said first detection terminal and its base to said first resistance varying terminal; and said field effect transistor has its gate connected to said second resistance varying terminal.

18. The apparatus according to claim 2 wherein said comparison transistor has its emitter connected to said second detection terminal, and its base to said first detection terminal through said reference resistor, and also to one side of the DC power source through said field effect transistor.

19. The apparatus according to claim 18 wherein the said comparison transistor has its collector connected to the base of the said power supply control transistor and also to the collector of said control transistor through the bias resistor thereof.

20. The apparatus according to claim 19 wherein the said field effect transistor has its source directly connected to its gate.

21. The apparatus according to claim 19 wherein the said field effect transistor has its source connected to its gate through a source resistor.

22. The apparatus according to claim 21 including motor speed resistor is connected between the base and collector of said power supply control transistor.

23. The apparatus according to claim 18 wherein said field effect transistor has its source directly connected to its gate.

24. The apparatus according to claim 18 wherein said field effect transistor has its source connected to its gate through a source resistor.

25. The apparatus according to claim 18 wherein said comparison transistor has its base connected to the source of the said field effect transistor.

26. The apparatus according to claim 18 wheren the said comparison transistor has its base connected to the drain of the said field effect transisor.

27. The apparatus according to claim 18 wherein said reference resistor is a variable resistor including first and second resistance varying terminals; said comparison transistor has its emitter connected to said second detection terminal and its base to said first resistance varying terminal; and said field effect transistor has its gate connected to said second resistance varying terminal.

28. The apparatus according to claim 27 including a motor speed control resistor connected between the base and collector of said power supply control transistor.

29. The apparatus according to claim 2 wherein said comparison transistor has its emitter connected to said second detection terminal, and said field effect transistor has its drain connected to one of the power supply terminals.

30. The apparatus according to claim 29 wherein the said field effect tansistor has its source directly connected to its gate.

31. The apparatus according to claim 29 wherein said field effect transistor has its source conected to its gate through a source resistor.

32. The apparatus according to claim 2 wherein the said reference reistor of the reference voltage generating circuit is additionally provided with a temperature compensating heat-sensitive resistor element.

33. The appartus according to claim 32 wherein there is connected between said comparison transistor and power supply control transistor an amplification transistor for reversing the phase of a control signal supplied to said power supply control tranistor from said comparisn transistor.

34. The apparatus according to claim 33 wherein there are connected between the emitter of the said comparison transistor and the said first detection terminal a parallel circuit consisting of a reference resistor and thermistor and a level adjustment resistor connected in series with said parallel circuit.

35. The apparatus according to claim 1 wherein said comparator means includes a comparison transistor having base, emitter and collector sections, said base being connected to one of said first and second detection terminals, said collector connected to the base of said power supply control transistor and said emitter conneced to a reference voltage derived from said reference voltage generating circuit.

36. The apparatus according to claim 35 wherein said comparison transistor has its base connected to said first detection terminal and its emitter connected to said second detection terminal through said reference resistor and also to one of said power supply terminals through said field effect transistor.

37. The apparatus according to claim 36 wherein said reference resistor is a variable resistor provided with first and second resistance varying terminals; said comparison transistor has its base connected to said first detection terminal and its emitter to said first resistance varying terminal; and said field effect transistor has its gate connected to said second resistance varying terminal.

38. The apparatus according to claim 37 wherein the motor speed control resistor is connected between the base and collector of the said power supply control transistor.

39. The apparatus according to claim 36 wherein said comparison transistor has its collector connected to the base of said power supply control transistor and also to the collector thereof through a motor speed control resistor.

40. The apparatus according to claim 39 wherein said field effect transistor has its source directly connected to its gate.

41. The apparatus according to claim 39 wherein said field effect transistor has its source connected to its gate through a source resistor.

42. The apparatus according to claim 36 wherein said field effect transistor has its source directly connected to its gate.

43. The appartus according to claim 36 wherein said field effect transistor has its source connected to its gate through a source resistor.

44. The apparatus according to claim 36 wherein said comparison transistor has its emitter connected to the source of the said field effect transistor.

45. The apparatus according to claim 35 wherein the said comparison transistor has its emitter connected to the drain of said field effect transistor.

46. The apparatus according to claim 35 wherein the said comparison transistor has its base connected to the said second detection terminal and its emitter connected to the said first detection terminal through said reference resistor and also to one end of the D.C. power source through said field effect transistor.

47. The apparatus according to claim 46 wherein said reference resistor is a variable resistor provided with first and second resistance varying terminals; said comparison transistor has its base connected to said second detection terminal and its emitter to said first resistance varying terminal; and said field effect transistor has its gate connected to said second resistance varying terminal.

48. The apparatus according to claim 46 wherein said field effect transistor has its source directly connected to its gate.

49. The apparatus according to claim 46 wherein said field effect transistor has its source connected to its gate through a source resistor.

50. The apparatus according to claim 49 wherein a bias resistor is connected between the base and collector of the said power supply control transistor.

51. The apparatus according to claim 46 wherein said comparison transistor has its emitter connected to the source of the said field effect transistor.

52. The apparatus according to claim 46 wherein said comparison transistor has its emitter connected to the drain of said field effect transistor.

53. The apparatus according to claim 35 wherein said comparison transistor has its base connected to the said second detection terminal and its emitter connected to said first detection terminal and also to one of said power supply terminals through said field effect transistor.

54. The apparatus according to claim 53 wherein the said comparison transistor has its collector connected to the said base of a power supply control transistor and also to the collector thereof through the motor speed control resistor.

55. The apparatus according to claim 54 wherein the said field effect transistor has its source directly connected to its gate.

56. The apparatus according to claim 54 wherein the said field effect transistor has its source connected to its gate through a source resistor.

57. The apparatus according to claim 53 wherein the said field effect transistor has its source directly connected to its gate.

58. The apparatus according to claim 53 wherein the said field effect transistor has its source connected to its gate through a source resistor.

59. The apparatus according to claim 53 wherein the said reference resistor is a variable resistor provided with first and second resistance varying terminals; said comparison transistor has its base connected to the said second detection terminal and its emitter to the said first resistance varying terminal; and the said field effect transistor has its gate connected to the said second resistance varying terminal.

60. The apparatus according to claim 53 wherein the said comparison transistor has its emitter connected to the source of the said field effect transistor.

61. The apparatus according to claim 53 wherein the comparison transistor has its emitter connected to the drain of the field effect transistor.

62. The apparatus according to claim 35 wherein the said reference resistor of the reference voltage generating circuit is additionally provided with a temperature compensating heat-sensitive resistor element.

63. The apparatus according to claim 62 wherein there is connected between the said comparison transistor and power supply control transistor and amplification transistor for reversing the phase of control signals supplied to the said power supply control transistor from said comparison transistor.

* * * * *